US010063621B2

(12) United States Patent
Patel

(10) Patent No.: US 10,063,621 B2
(45) Date of Patent: Aug. 28, 2018

(54) SYSTEMS AND METHODS FOR ENABLING USERS TO RECEIVE ACCESS TO CONTENT IN CLOSED NETWORK

(71) Applicant: Rovi Guides, Inc., Santa Clara, CA (US)

(72) Inventor: Milan Indu Patel, Santa Clara, CA (US)

(73) Assignee: Rovi Guides, Inc., San Jose, CA (US)

(*) Notice: Subject to any disclaimer, the term of this patent is extended or adjusted under 35 U.S.C. 154(b) by 275 days.

(21) Appl. No.: 15/010,602

(22) Filed: Jan. 29, 2016

(65) Prior Publication Data
US 2017/0223088 A1 Aug. 3, 2017

(51) Int. Cl.
G06F 15/16 (2006.01)
H04L 29/08 (2006.01)
H04W 84/12 (2009.01)

(52) U.S. Cl.
CPC ............ *H04L 67/06* (2013.01); *H04W 84/12* (2013.01)

(58) Field of Classification Search
CPC ....... G06F 9/5072; H04L 67/02; H04L 67/34; H04L 67/42
See application file for complete search history.

(56) References Cited

U.S. PATENT DOCUMENTS

| 5,732,347 | A | 3/1998 | Bartle et al. |
| 6,239,794 | B1 | 5/2001 | Yuen et al. |
| 6,388,714 | B1 | 5/2002 | Schein et al. |
| 6,564,378 | B1 | 5/2003 | Satterfield et al. |
| 6,704,571 | B1 | 3/2004 | Moon |
| 6,756,997 | B1 | 6/2004 | Ward et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 8,825,551 | B2 | 9/2014 | Peterka et al. |
| 9,009,794 | B2 | 4/2015 | Dykeman et al. |
| 2002/0174430 | A1 | 11/2002 | Ellis et al. |
| 2003/0110499 | A1 | 6/2003 | Knudson et al. |
| 2005/0114711 | A1* | 5/2005 | Hesselink ........... H04L 63/0209 726/4 |
| 2005/0138186 | A1* | 6/2005 | Hesselink ........... H04L 63/0209 709/229 |

(Continued)

FOREIGN PATENT DOCUMENTS

DE 10 2010 039 440 2/2012
DE 10 2015 108729 12/2015

*Primary Examiner* — Davoud Zand
(74) *Attorney, Agent, or Firm* — Haley Guiliano LLP

(57) ABSTRACT

Systems and methods are provided herein for enabling a plurality of users in a closed environment, such as an environment where users cannot access or have limited access to the Internet, to share media while retaining ownership rights to their media, and while ensuring that processing power of their devices is not unduly burdened by the sharing. For example, users may be able to establish a group, and may be able to transfer media amongst one another. The system described herein may recommend content using not only what is stored on the user's device, but also content stored on devices of other users of the established group. Access controls may be implemented to ensure that the media is returned to its rightful owner at the end of a viewing, and to ensure that a user's viewing plans are not interrupted by the desires of another user.

18 Claims, 13 Drawing Sheets

(56) References Cited

U.S. PATENT DOCUMENTS

| | | | |
|---|---|---|---|
| 2005/0144186 A1* | 6/2005 | Hesselink | H04L 67/06 |
| 2005/0144195 A1* | 6/2005 | Hesselink | H04L 63/0209 |
| 2005/0149481 A1* | 7/2005 | Hesselink | H04L 63/0209 |
| 2005/0251827 A1 | 11/2005 | Ellis et al. | |
| 2007/0015486 A1 | 1/2007 | Marlowe | |
| 2009/0228536 A1 | 9/2009 | Rauhala | |
| 2010/0138879 A1 | 6/2010 | Bird et al. | |
| 2010/0153885 A1 | 6/2010 | Yates | |
| 2010/0162325 A1 | 6/2010 | Bonar | |
| 2010/0254348 A1 | 10/2010 | Prakash et al. | |
| 2010/0329205 A1 | 12/2010 | Bi et al. | |
| 2011/0170008 A1* | 7/2011 | Koch | H04N 9/75 348/592 |
| 2012/0265644 A1* | 10/2012 | Roa | G06Q 30/0643 705/26.61 |
| 2013/0139269 A1 | 5/2013 | Shaikh et al. | |
| 2013/0174223 A1* | 7/2013 | Dykeman | G06F 21/10 726/4 |
| 2014/0067828 A1* | 3/2014 | Archibong | H04L 65/4084 707/748 |
| 2014/0195675 A1* | 7/2014 | Silver | H04L 65/1083 709/224 |
| 2014/0230076 A1* | 8/2014 | Micucci | G06F 17/30861 726/28 |
| 2014/0245352 A1* | 8/2014 | Tseng | H04N 21/26291 725/40 |
| 2014/0281559 A1* | 9/2014 | Trachtenberg | H04L 63/0457 713/178 |
| 2015/0019999 A1* | 1/2015 | Page | H04L 65/1016 715/753 |
| 2015/0227268 A1* | 8/2015 | Rathod | G06F 17/30867 715/739 |
| 2015/0382027 A1 | 12/2015 | Margis et al. | |

* cited by examiner

SYSTEMS AND METHODS FOR ENABLING USERS TO RECEIVE ACCESS TO CONTENT IN CLOSED NETWORK

BACKGROUND

While the Internet is generally ubiquitous, there are times when the Internet is inaccessible or limited, such as when traveling on an airplane, train or bus. Entertainment options for such a user are limited in these instances to entertainment that the user has stored on his personal user equipment device(s). Personal devices tend to have limited storage space, and thus often cannot store sufficient entertainment for a user in such a scenario.

SUMMARY

Systems and methods are provided herein for enabling a plurality of users in a closed environment, such as an environment where users cannot access the Internet, to share media while retaining ownership rights to their media, and while ensuring that processing power of their devices is not unduly burdened by the sharing. For example, using the systems and methods described herein, users may be able to establish a group (e.g., by way of a wireless network hotspot), and may be able to transfer media amongst one another to expand their entertainment options. Access controls may be implemented to ensure that the media is returned to its rightful owner at the end of a viewing, and to ensure that a user's viewing plans are not interrupted by the desires of another user.

In some aspects, control circuitry may receive a first request from a first user equipment to join a group established on a network of a closed environment, where the group comprises a plurality of user equipment, and wherein the Internet is not accessible in the closed environment. For example, a network may be established on an airplane (e.g., by way of a user establishing a hot spot on a user equipment, or by way of the airline setting up an access point for content sharing). A first user of a first user equipment may request to join the group by joining the network, or by logging into a subscription for content sharing. The Internet may not be accessible (or may not be accessible for free) to a user of the first user equipment.

In some embodiments, in response to receiving the first request, control circuitry may generate for display a plurality of media asset identifiers corresponding to media stored on each user equipment of the plurality of user equipment. For example, control circuitry may generate for display a media guidance application graphical user interface that includes media asset identifiers, thus enabling a user to browse media asset identifiers corresponding to media stored on each user device that is part of the group.

In some embodiments, control circuitry may receive a second request from the first user equipment to view a media asset corresponding to a media asset identifier of the plurality of media asset identifiers, where the media asset is stored at a second user equipment. For example, control circuitry may receive a request from a user to view a movie stored on another user's device.

In some embodiments, control circuitry may determine whether the media asset is available to the first user equipment. For example, control circuitry may determine whether the media asset is presently stored at the second user equipment. In response to determining that the media asset is presently stored at the second user equipment, control circuitry may determine whether the media asset is presently being played back at the second user equipment, and, in response to determining that the media asset is not presently being played back at the second user equipment, control circuitry may determine that the media asset is available to the first user equipment. By such a process, control circuitry may ensure that a user that wishes to view a media asset does not interrupt a viewing experience of another user. To this end, in some embodiments, control circuitry may determine whether a user of the second user equipment or a user of a third user equipment has reserved the media asset for playback at a time that is too soon to allow a user of the first user equipment to fully play back the media asset, and, in response to determining that neither the user of the second equipment nor the user of the third user equipment has reserved the media asset for playback at the time that is too soon to allow the user of the first user equipment to fully play back the media asset, control circuitry may determine that the media asset is available to the first user equipment.

In some embodiments, in response to determining that the media asset is available to the first user equipment, control circuitry may cause the media asset to be transferred from the second user equipment to storage of the first user equipment, where the media asset is played back at the first user equipment subsequent to the transferring. For example, a user may borrow media from a different user for playback at the user's own device.

In some embodiments, control circuitry may determine that the media asset has concluded playback at the first user equipment, and, in response to determining that the media asset has concluded playback at the first user equipment, control circuitry may cause the media asset to transfer from the first user equipment to the second user equipment. For example, to ensure that the original owner retains his media, when a user is done borrowing the media, the media may be automatically transferred back to the original owner.

In some embodiments, control circuitry may establish the group by detecting, at the first user equipment, that the Internet is not accessible, and by responsively establishing a network hotspot at the first user equipment. Control circuitry may then broadcast availability of the network hotspot to devices within broadcast range of the first user equipment, receive a request from the second user equipment to access the network hotspot and share media assets stored on the second user equipment with other user equipment that access the network hotspot, and grant access to the network hotspot to the second user equipment.

In some embodiments, control circuitry may access a user profile of a user of the first user equipment (e.g., by querying a database), and may determine a preference of the user based on data of the user profile (e.g., a user habit). Control circuitry may then compare metadata associated with each media asset that corresponds to each media asset identifier of the plurality of media asset identifiers to the preference, rank the plurality of media asset identifiers based on the comparing, and generate for display the plurality of media asset identifiers based on the ranking. In this manner, control circuitry may organize media asset identifiers of media stored on devices of the group in a manner more relevant to the browsing user.

In some embodiments, control circuitry may determine that the storage of the first user equipment does not have sufficient capacity to store the media asset. Control circuitry may determine whether the second user equipment has capacity to store a different media asset that is stored in the storage of the first user equipment, and, in response to determining that the second user equipment has capacity to store the different media asset, control circuitry may cause the different media asset to be transferred to the second user equipment from the first user equipment prior to causing the media asset to be transferred from the second user equipment to the storage of the first user equipment. In this manner, control circuitry of a given user equipment may temporarily swap a media asset to storage of a different device to make room for storing media assets to be borrowed from another device.

In some embodiments, when control circuitry is causing the media asset to transfer from the first user equipment to the second user equipment, control circuitry may determine that a connection between the first user equipment and the second user equipment has been torn down. For example, control circuitry may determine that the first user equipment is no longer in range of the second user equipment. Control circuitry may then monitor for an ability to access the Internet, and, in response to detecting the ability to access the Internet, control circuitry may transmit the media asset from the first user equipment to the second user equipment over the Internet. Thus, if media is not returned to its rightful owner, control circuitry may cause media to be returned to its rightful owner once Internet access is restored.

In some embodiments, control circuitry may determine that the media asset is not available to the first user equipment, and, in response to determining that the media asset is not available to the first user equipment, control circuitry may determine a time at which the media asset will be available to the first user equipment. Control circuitry may then generate for display an option to reserve access to the media asset for the first user equipment at the time. For example, control circuitry may determine how much time is left for a given user to complete playback of a movie, and may allow a user desiring to watch that movie to reserve access upon the completion time. In some embodiments, when control circuitry determines the time at which the media asset will be available to the first user equipment, control circuitry may determine that the media asset is being played back by the second user equipment. Control circuitry may then determine an amount of time that remains until playback by the second user equipment will be complete, add the amount of time to the present time to calculate a resultant time, and determine the time to be the resultant time.

In some embodiments, control circuitry may, in response to receiving the second request, determine whether a user of the second user equipment has granted access rights to a user of the first user equipment to access the media asset, and, in response to determining that the user of the second user equipment has granted access rights to the user of the first user equipment, control circuitry may access to the first user equipment to access the media asset. Thus, control circuitry may enable a user to password protect or otherwise ensure that only some members of the group have access to some or all of the user's media.

In some aspects, systems and methods are provided herein for, after the media is transferred from the second user equipment to the first user equipment, control circuitry monitoring for a condition that indicates an end to the group is imminent. In response to detecting, during the monitoring, the condition that indicates an end to the group is imminent, control circuitry may cause the media asset to be transferred from the storage of the first user equipment to storage of the second user equipment. For example, control circuitry may detect, during air travel, that an airplane's altitude is about to be reached where a network connection is to be automatically torn down, or that, during air travel, an airplane that the first user equipment is contained within is about to land. In such an instance, control circuitry may cause the media to be returned to its rightful owner.

In some embodiments, control circuitry may cause the media asset to be transferred from the storage of the first user equipment to storage of the second user equipment automatically, without receiving a command from a user. Control circuitry may trigger this in response to detecting an imminent end to the group.

In some embodiments, in response to detecting, during the monitoring, the condition that indicates an end to the group is imminent, and prior to causing the media asset to be transferred from the storage of the first user equipment to the storage of the second user equipment, control circuitry may generate for display on the first user equipment an alert that indicates that the media asset is about to be transferred. For example, the alert may note that an airplane is about to land, and thus the media will be transferred back to its rightful owner.

In some embodiments, control circuitry may receive a request from a first user equipment to view a media asset that is stored at a second user equipment, wherein the first user equipment and the second user equipment are part of a group that is in connection in a closed environment where the Internet is not accessible; cause the media asset to be transferred from the second user equipment to storage of the first user equipment; determine that the media asset has concluded playback at the first user equipment; and in response to determining that the media asset has concluded playback at the first user equipment, cause the media asset to transfer from the first user equipment to the second user equipment.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 1:
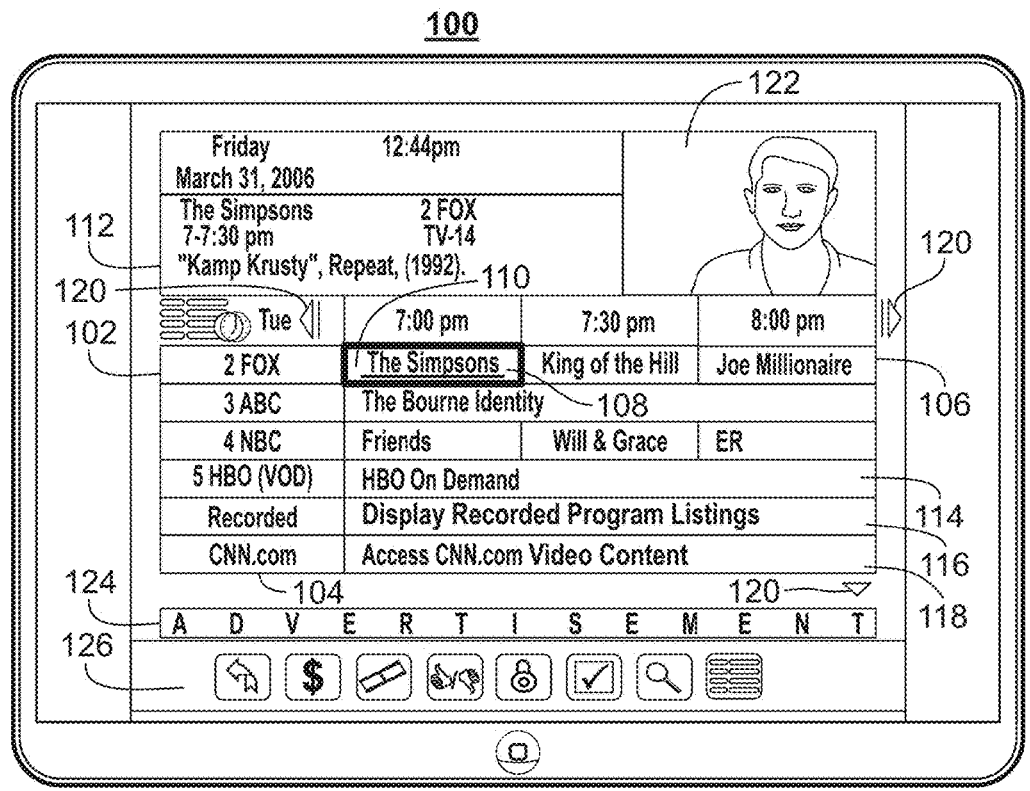
FIG. 1 shows an illustrative embodiment of a display screen that may be used to provide media guidance application listings and other media guidance information, in accordance with some embodiments of the disclosure.

Systems and methods are provided herein for enabling a plurality of users in a closed environment, such as an environment where users cannot access the Internet, to share media while retaining ownership rights to their media, and while ensuring that processing power of their devices is not unduly burdened by the sharing. For example, using the systems and methods described herein, users may be able to establish a group (e.g., by way of a wireless network hotspot), and may be able to transfer media amongst one another to expand their entertainment options. Access controls may be implemented to ensure that the media is returned to its rightful owner at the end of a viewing, and to ensure that a user's viewing plans are not interrupted by the desires of another user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
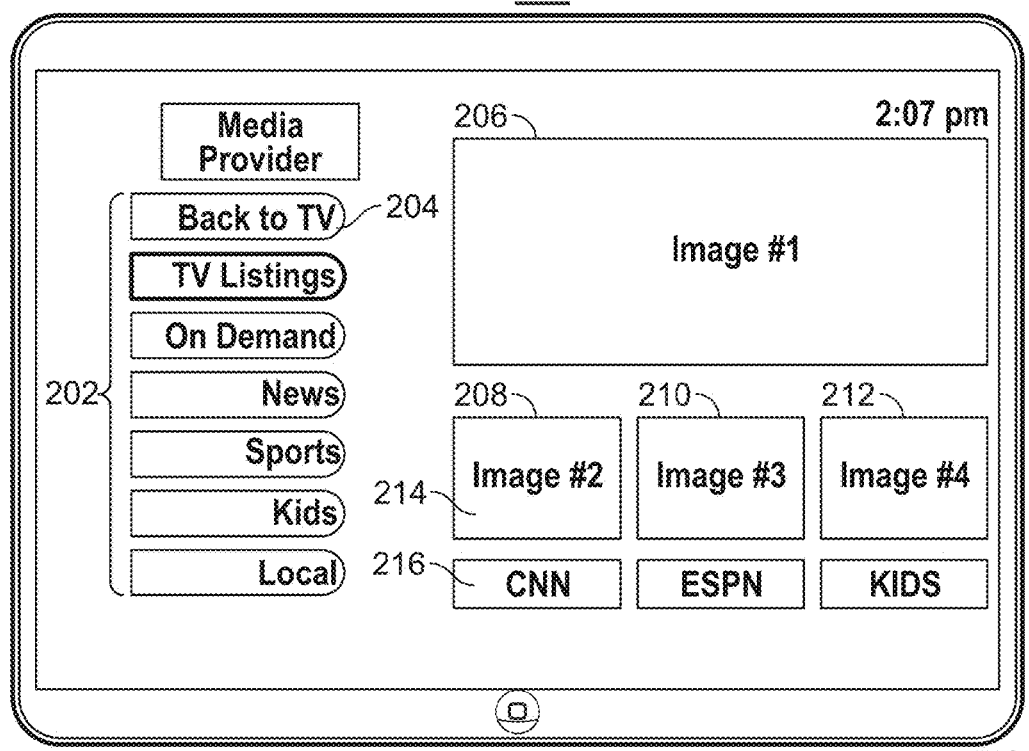
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
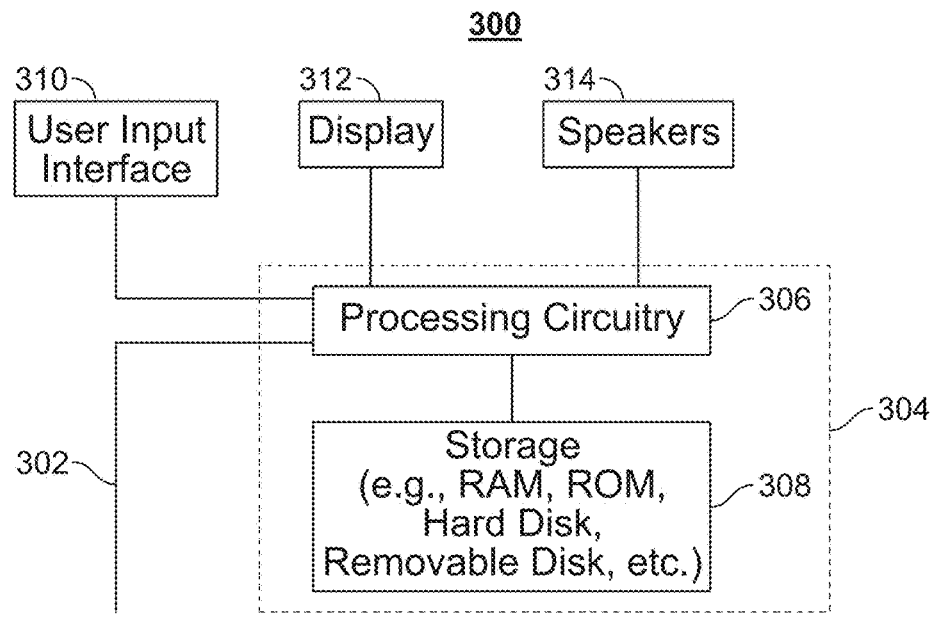
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
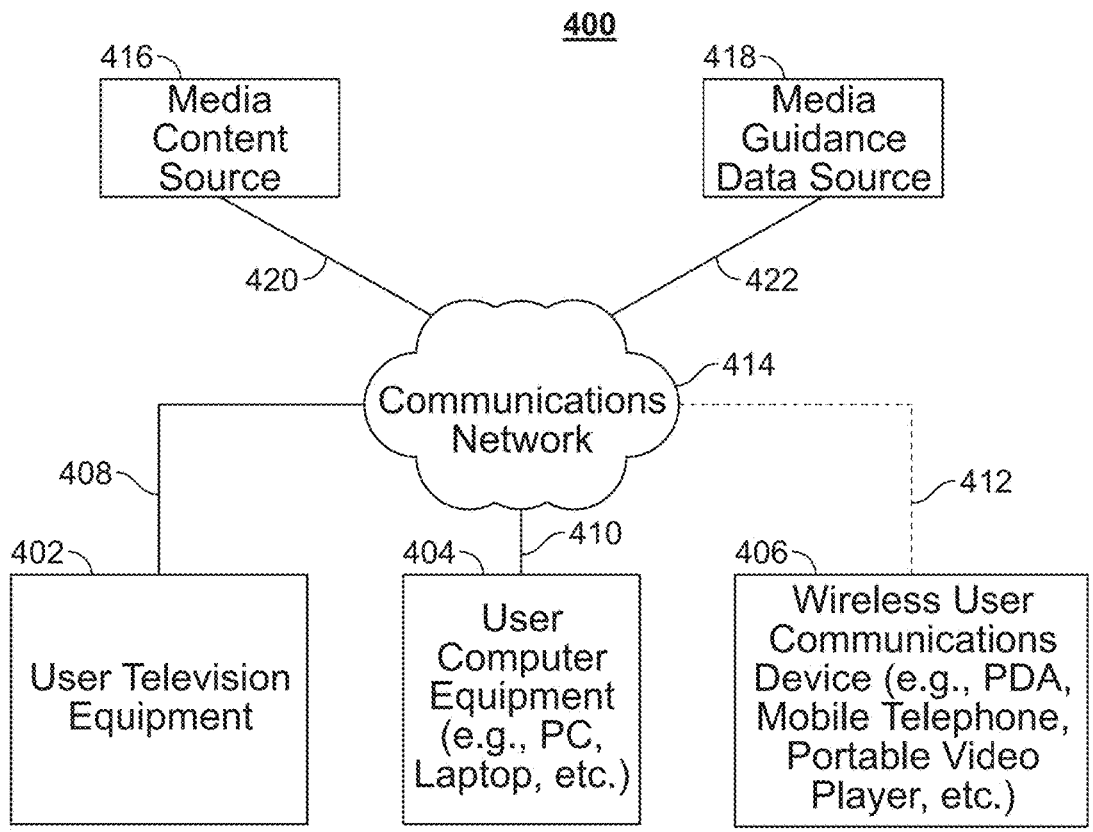
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
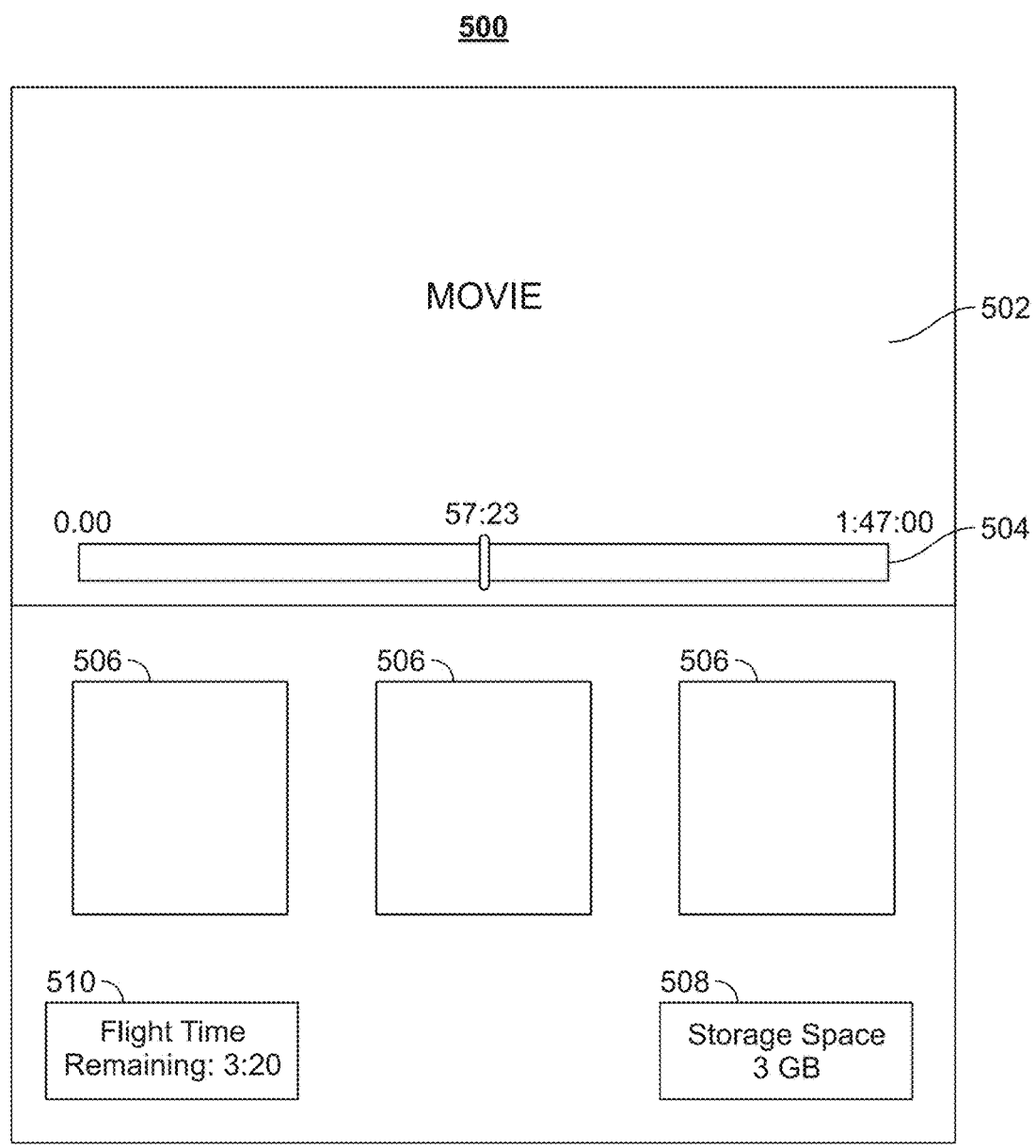
FIG. 5 depicts a user equipment that is displaying a graphical user interface for a media consumption application, in accordance with some embodiments of the disclosure.

FIG. 5 depicts a user equipment that is displaying a graphical user interface for a media consumption application, in accordance with some embodiments of the disclosure. User equipment 500 may generate for display media asset 502, progress bar 504, media asset identifiers 506, storage space identifier 508, and time limit indicator 510. User equipment 500 may have the capabilities of any of user television equipment 402, user computer equipment 404, and wireless user communications device 406. User equipment 500 may generate for display the media consumption application (which is synonymous with, and used interchangeably with, the above-described media guidance application) using display 312.

In some embodiments, control circuitry 304 of user equipment 500 may execute a method for enabling a plurality of users in a closed environment to share media while retaining ownership rights to the media. To this end, control circuitry 304 may receive a first request from a first user equipment (e.g., user equipment 500) to join a group established on a network of a closed environment. For example, control circuitry 304 may detect that a user of user equipment 500 has selected (using user input interface 310) a selectable option on display 312 to join the group. The group may include a plurality of user equipment—for example, other user equipment that are on a same airplane as user equipment 500. In the primary example of this disclosure, the Internet is not accessible to user equipment 500 (i.e., user equipment 500 is in a "closed environment") because the Internet is not accessible on an airplane. However, as used herein, in a "closed environment," there may be any number of reasons why the environment is closed, and thus the Internet is not accessible. For example, an airline or other service may charge money for accessing the Internet, which may not be desirable to users. As another example, a closed environment may be an environment where there is insufficient Internet connectivity to stream media without undue latency over the Internet. The term "unavailable" as used herein refers to any obstacle to seamless access of the Internet.

In some embodiments, control circuitry 304 may establish the group by first detecting, at user equipment 500, that the Internet is not accessible. For example, control circuitry 304 may command a network card of user equipment 500 to detect whether Internet connectivity is available. When the Internet is not available, control circuitry 304 may establish a network hotspot at user equipment 500, and may cause user equipment 500 to broadcast availability of the network hotspot to devices within broadcast range of the first user equipment, such as the second user equipment. Control circuitry 304 may then receive a request from the second user equipment to access the network hotspot and share media assets stored on the second user equipment with other user equipment that access the network hotspot. Control circuitry 304 may then grant access to the network hotspot to the second user equipment.

In some embodiments, in response to receiving the first request, control circuitry 304 may generate for display (e.g., on display 312) a plurality of media asset identifiers (e.g., media asset identifiers 506) corresponding to media stored on each user equipment of the plurality of user equipment. For example, if there are three users who are parts of the group, control circuitry 304 may generate for display media asset identifiers 506 corresponding to media stored on each of the three user equipment corresponding to the three users.

In some embodiments, control circuitry 304 may organize media asset identifiers 506 based on parameters, such as preferences of the user of user equipment 500. As an example, control circuitry 304 may access a user profile of a user of the first user equipment (e.g., accessing media guidance data source 418 by way of communications network 414, or by accessing storage 308) and determine a preference of the user based on data of the user profile. Control circuitry 304 may then compare metadata associated with each media asset that corresponds to each media asset identifier 506 to the preference, and may rank media asset identifiers 506 based on the comparing. Control circuitry 304 may then generate for display the plurality of media asset identifiers based on the ranking. Thus, media asset identifiers 506 may be ranked based on a user's preferences, and a media asset that the user of user equipment 500 is most likely to prefer may have its media asset identifier 506 be generated for display in a more prominent position than other media asset identifiers 506.

In some embodiments, control circuitry 304 may receive a second request from the first user equipment (e.g., upon detecting a second user selection of a second selectable option by way of user input interface 310) to view a media asset corresponding to a media asset identifier 506, where the media asset is stored at a second user equipment that is different from user equipment 500, and that is part of the group. In processing this request, control circuitry 304 may first determine whether the media asset is available to the first user equipment (user equipment 500).

In order to determine whether the media asset is available to user equipment 500, control circuitry 304 may first determine whether the media asset (e.g., media asset 502) is presently stored at the second user equipment. For example, media asset 502 may presently be stored at a third user equipment of a different user of the group because the different user is viewing media asset 502, and thus media asset 502 may be unavailable to user equipment 500.

In response to determining that media asset 502 is presently stored at the second user equipment, control circuitry 304 may determine whether media asset 502 is presently being played back at the second user equipment. For example, if the user of the second user equipment is presently viewing media asset 502, then control circuitry 304 causing media asset 502 to be transferred to storage 308 of user equipment 500 would be disruptive to the user of the second user equipment. In response to determining that media asset 502 is not presently being played back at the second user equipment, and thus that transferring media asset 502 to storage 508 of user equipment 500 would not be disruptive to the user of the second user equipment, control circuitry 304 may determine that the media asset is available to the first user equipment.

In connection with determining whether media asset 502 is available to user equipment 500, control circuitry 304 may also determine whether a user of the second user equipment or a user of a third user equipment has reserved media asset 502 for playback at a time that is too soon to allow a user of the first user equipment to fully play back media asset 502. For example, control circuitry 304 may determine whether a different user has already reserved media asset 502 for a particular time, and may determine whether playback of media asset 502 in its entirety at user equipment 500 would cause a conflict with the particular time. In response to determining that neither the user of the second equipment nor the user of the third user equipment has reserved media asset 502 for playback at the time that is too soon to allow the user of the first user equipment to fully play back media asset 502, control circuitry 304 may determine that media asset 502 is available to the first user equipment.

In some embodiments, control circuitry 304 may determine that media asset 502 is not available to the user equipment 500, and, in response, control circuitry 304 may determine a time at which media asset 502 will be available to the first user equipment. For example, as depicted in FIG. 5, progress bar 504 may indicate that a different user is 00:57:23 through a 1:47:00 long media asset. Thus, control circuitry 304 may determine that media asset 502 will be available in about an hour. Control circuitry 304 may generate for display on display 312 of user equipment 500 an option for a user of user equipment 500 to reserve access to the media asset for the first user equipment at the time.

Following from this scenario, in order to determine when media asset 502 will be available, control circuitry 304 may determine that media asset 502 is being played back by the second user equipment. Control circuitry 304 may then determine an amount of time that remains until playback by the second user equipment will be complete, add the amount of time to the present time to calculate a resultant time, and may determine the time to be the resultant time. The resultant time thus may be indicated to the user of user equipment 500 as a time that the user must wait before accessing media asset 502.

In some embodiments, in response to determining that media asset 502 is available to the first user equipment, control circuitry 304 may cause media asset 502 to be transferred from the second user equipment to storage 308 of user equipment 500. The transfer may occur over communications network 414. Control circuitry 304 may cause media asset 502 to be played back at user equipment 500 subsequent to the transferring.

In some embodiments, control circuitry 304 may determine that media asset 502 has concluded playback at the user equipment 500, and, in response to determining that media asset 502 has concluded playback at the first user equipment, control circuitry 304 may cause media asset 502 to transfer from the first user equipment to the second user equipment. Media asset 502 may be transferred from user equipment 500 to the second user equipment by way of communications network 414. In some embodiments, control circuitry 304 may automatically initiate this transfer immediately upon conclusion of playback of media asset 502. This is to ensure that media asset 502 is returned to its rightful owner.

In some embodiments, control circuitry 304 may not be able to immediately cause media asset 502 to transfer from the first user equipment to the second user equipment. For example, control circuitry 304 may detect a connection (e.g., communications network 414) between user equipment 500 and the second user equipment has been torn down. For example, a connection may be torn down for any number of reasons, such as a user turning off a hotspot, a user powering down user equipment 500, an access point being powered down or disabled (e.g., by an airplane operator), and the like.

In some embodiments, control circuitry 304 may, responsive to detecting that the connection has been torn down, monitor for an ability to access the Internet. For example, control circuitry 304 may monitor for access to a WiFi network. In response to detecting the ability to access the Internet, control circuitry 304 may access the Internet, and may transmit the media asset from user equipment 500 to the second user equipment over the Internet. This mechanism may act as a failsafe to ensure that media asset 502 is returned to its rightful owner even if the connection between user equipment 500 and the second user equipment is unexpectedly torn down.

In some embodiments, control circuitry 304 may determine that storage 308 of user equipment 500 does not have sufficient capacity to store media asset 502. For example, as indicated in storage space indicator 508, control circuitry 304 may determine that only 3 gigabytes of storage are available on user equipment 500, and may also determine that media asset 502 requires 5 gigabytes of storage. Control circuitry 304 may determine whether the second user equipment has capacity to store a different media asset that is stored in the storage 308 of user equipment 500. If such storage space is available, control circuitry 304 may orchestrate a swap between media assets so that storage 308 of user equipment 500 has sufficient storage space to store media asset 502. To this end, in response to determining that the second user equipment has capacity to store the different media asset, control circuitry 304 may cause the different media asset to be transferred to the second user equipment from storage 308 of user equipment 500 prior to causing media asset 502 to be transferred from the second user equipment to storage 508 of user equipment 500.

In some embodiments, control circuitry 304 may, in response to receiving the second request, determine whether a user of the second user equipment has granted access rights to a user of user equipment 500 to access media asset 502, and, in response to determining that the user of the second user equipment has granted access rights to the user of user equipment 500, control circuitry 304 may grant access to user equipment 500 to access media asset 502. In such a manner, control circuitry 304 may enable users to set access controls for individual media assets, for groups of media assets, or for entire libraries of media assets.

In some aspects, systems and methods are provided for, subsequent to, and responsive to, causing media asset 502 to transfer from the second user equipment to user equipment 500, monitoring for a condition that indicates an end to the group is imminent. For example, control circuitry 304 may monitor for a detection that, during air travel, an altitude is about to be reached where a network connection is to be automatically torn down. As another example, control circuitry 304 may monitor to detect, during air travel, that an airplane that user equipment 500 is contained within is about to land. Control circuitry 304 may perform these determinations by querying media guidance data source 418 to learn the remaining flight time (e.g., as indicated by flight time indicator 510). Other conditions that indicate an end to the group is imminent are possible. For example, control circuitry 304 may detect a user input that specifies that the network is about to be torn down, or may detect an input from an airline, or from any other source.

In some embodiments, in response to detecting, during the monitoring, the condition that indicates an end to the group is imminent, control circuitry 304 may cause media asset 502 to be transferred from storage 308 of user equipment 500 to storage of the second user equipment. In some embodiments, control circuitry 304 may cause the transfer of media asset 502 from storage 308 of user equipment 500 to the second user equipment automatically, and without receiving a command from a user, upon detecting the condition.

In some embodiments, control circuitry 304 may, in response to detecting an end to the group is imminent, and prior to causing the media asset to be transferred from the storage of the first user equipment to the storage of the second user equipment, generating for display on the first user equipment an alert that indicates that media asset 502 is about to be transferred. Alternatively, or additionally, control circuitry 304 may pause media asset 502 at this time. Alternatively, or additionally, control circuitry 304 may generate for display options for the user of user equipment 500 to access media asset 502 subsequent to media asset 502 being transferred away. Alternatively, or additionally, control circuitry 304 may generate for display an option for a user of user equipment 500 to purchase media asset 502 from the user of the second user equipment. If control circuitry 304 detects a selection of this option, control circuitry 304 may ensure that media asset 502 is not transferred away from user equipment 500.

Figure 6:
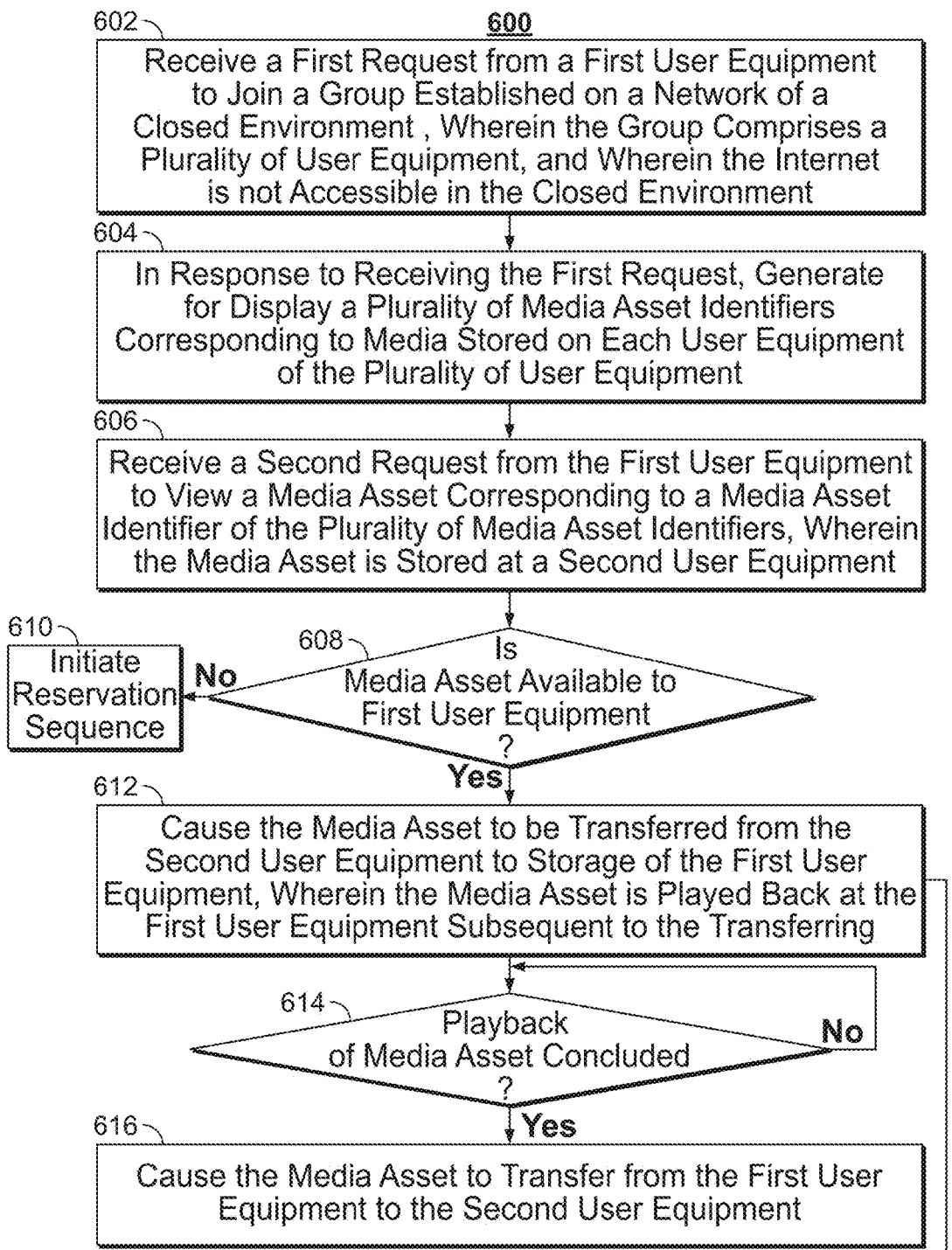
FIG. 6 is a flowchart of illustrative steps involved in ensuring that a media asset shared with a user in a closed environment is returned to its owner, in accordance with some embodiments of the disclosure.
Figure 6:
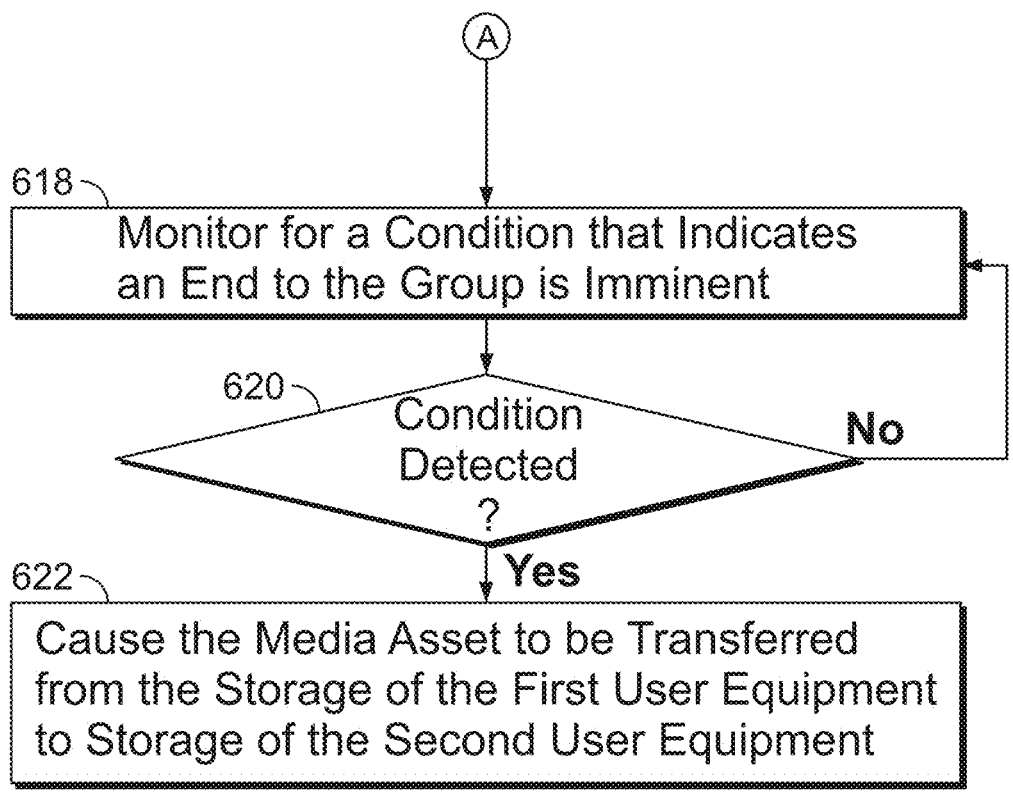

FIG. 6 is a flowchart of illustrative steps involved in ensuring that a media asset shared with a user in a closed environment is returned to its owner, in accordance with some embodiments of the disclosure. Process 600 of FIG. 6 begins at 602, where control circuitry 304 may receive a first request from a first user equipment (e.g., user equipment 500) to join a group established on a network of a closed environment. For example, control circuitry 304 may detect that a user of user equipment 500 has selected (using user input interface 310) a selectable option on display 312 to join the group.

Process 600 continues to 604, where, in response to receiving the first request, control circuitry 304 may generate for display (e.g., on display 312) a plurality of media asset identifiers (e.g., media asset identifiers 506) corresponding to media stored on each user equipment of the plurality of user equipment. For example, if there are three users who are parts of the group, control circuitry 304 may generate for display media asset identifiers 506 corresponding to media stored on each of the three user equipment corresponding to the three users.

Process 600 continues to 606, where control circuitry 304 may receive a second request from the first user equipment (e.g., upon detecting a second user selection of a second selectable option by way of user input interface 310) to view a media asset corresponding to a media asset identifier 506, where the media asset is stored at a second user equipment that is different from user equipment 500, and that is part of the group. In processing this request, process 600 may continue to 608, where control circuitry 304 may first determine whether the media asset is available to the first user equipment (user equipment 500). If the media asset is not available to the first user equipment, process 600 may continue to 610, where either the user is informed that the media asset is not available or control circuitry 304 initiates a subroutine to allow the user to reserve the media asset for playback at a later time, as is described in detail above and below. If the media asset is available, process 600 continues to 612.

At 612, in response to determining that the media asset is available to the first user equipment, control circuitry 304 may cause the media asset to be transferred from the second user equipment to storage 308 of user equipment 500. The transfer may occur over communications network 414. Control circuitry 304 may cause the media asset to be played back at user equipment 500 subsequent to the transferring.

Process 600 may, subsequent to executing 612, proceed to 614, or to 618. If process 600 continues from 612 to 614, control circuitry 304 may determine whether the media asset has concluded playback at the user equipment 500. If the media asset has concluded playback, process 600 continues to 616. If the media asset has not concluded playback, 614 repeats. At 616, in response to determining that media asset 502 has concluded playback at the first user equipment, control circuitry 304 may cause the media asset to transfer from the first user equipment to the second user equipment. The media asset may be transferred from user equipment 500 to the second user equipment by way of communications network 414. In some embodiments, control circuitry 304 may automatically initiate this transfer immediately upon conclusion of playback of the media asset. This is to ensure that the media asset is returned to its rightful owner.

As discussed above, process 600 may alternatively continue from 612 to 618, instead of from 612 to 614. If process 600 continues to 618, control circuitry 304 may monitor for a condition that indicates an end to the group is imminent. For example, control circuitry 304 may monitor for a detection that, during air travel, an altitude is about to be reached where a network connection is to be automatically torn down. As another example, control circuitry 304 may monitor to detect, during air travel, that an airplane that user equipment 500 is contained within is about to land. At 620, control circuitry 304 may determine whether such a condition has been detected, and may revert back to 618 to continue monitoring when no such condition is detected.

If such a condition is detected, process 600 continues to 622, where, in response to detecting, during the monitoring, the condition that indicates an end to the group is imminent, control circuitry 304 may cause the media asset to be transferred from storage 308 of user equipment 500 to storage of the second user equipment. In some embodiments, control circuitry 304 may cause the transfer of the media asset from storage 308 of user equipment 500 to the second user equipment automatically, and without receiving a command from a user, upon detecting the condition.

Figure 7:
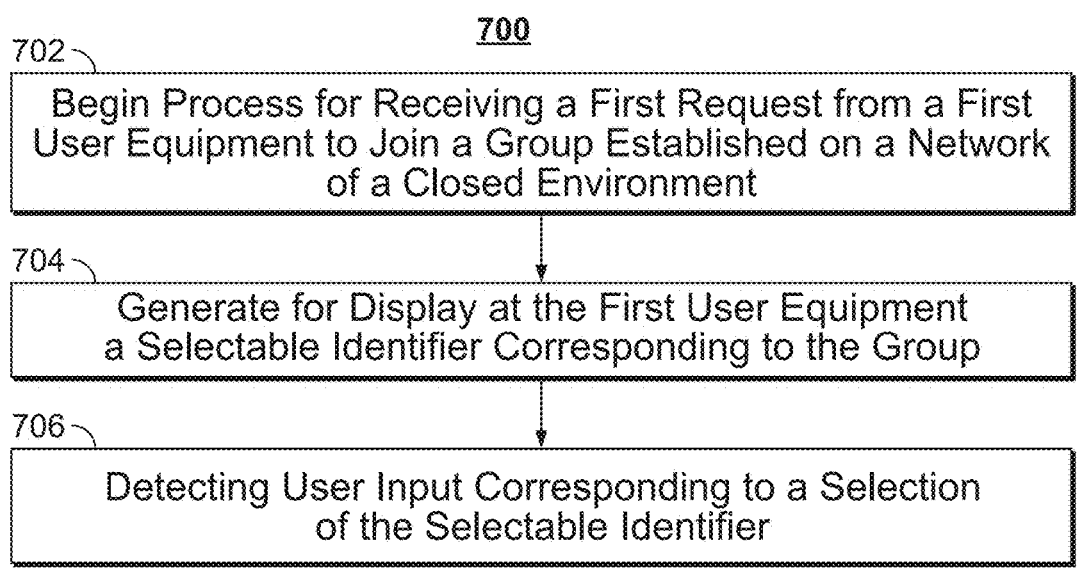
FIG. 7 is a flowchart of illustrative steps involved in receiving a request from a user equipment to join a group established on a network of a closed environment, in accordance with some embodiments of the disclosure.

FIG. 7 is a flowchart of illustrative steps involved in receiving a request from a user equipment to join a group established on a network of a closed environment, in accordance with some embodiments of the disclosure. Process 700 of FIG. 7 begins at 702, where control circuitry 304 may begin a process for receiving a first request from a first user equipment to join a group established on a network of a closed environment. After beginning the process, process 700 continues to 704, where control circuitry 304 may generate for display (e.g., on display 312) at the first user equipment (e.g., user equipment 500) a selectable identifier corresponding to the group. Process 700 continues to 706, where control circuitry 304 may detect user input (e.g., by way of user input interface 310) that corresponds to a selection of the selectable identifier. The user input may form the first request.

Figure 8:
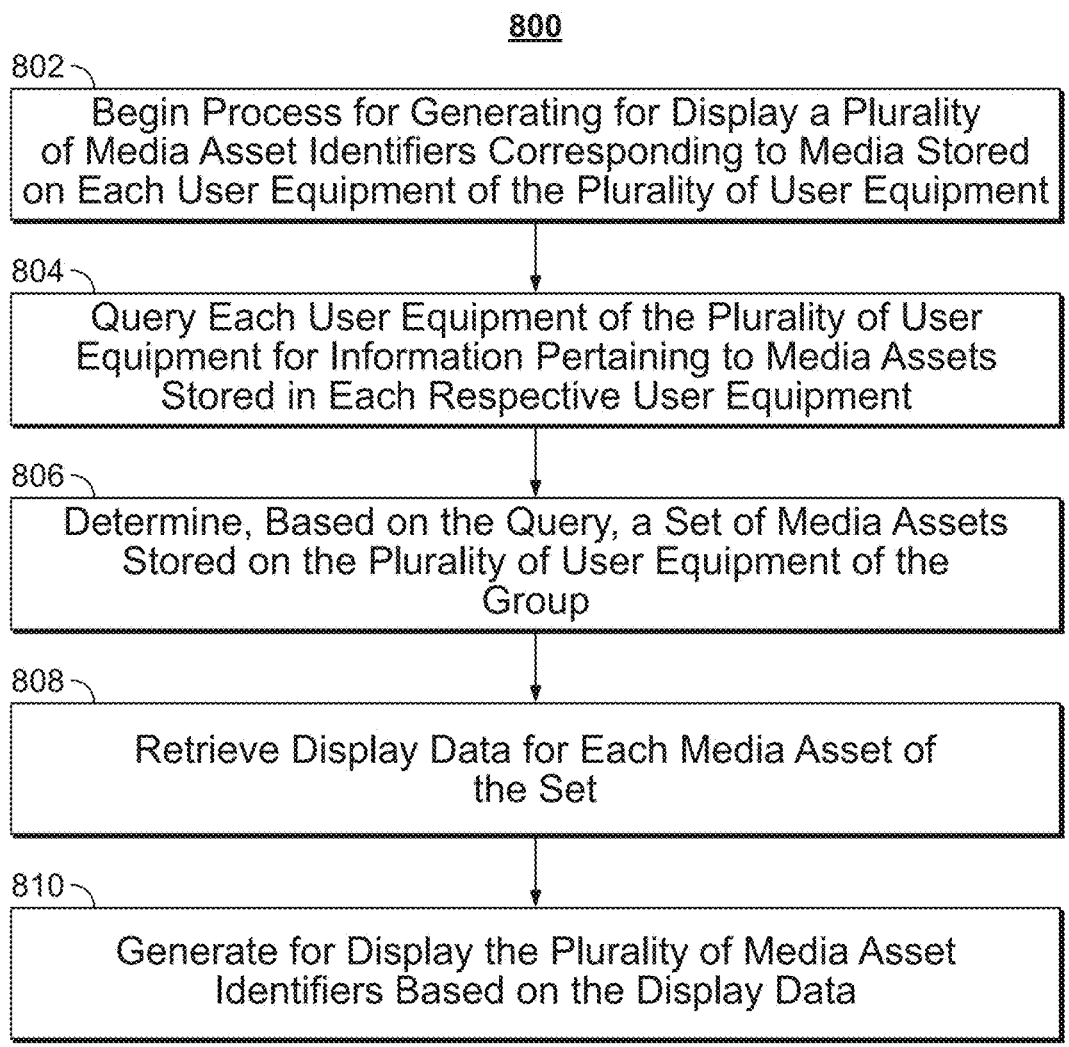
FIG. 8 is a flowchart of illustrative steps involved in generating for display a plurality of media asset identifiers corresponding to media stored on each media asset of a group, in accordance with some embodiments of the disclosure.

FIG. 8 is a flowchart of illustrative steps involved in generating for display a plurality of media asset identifiers corresponding to media stored on each media asset of a group, in accordance with some embodiments of the disclosure. Process 800 of FIG. 8 begins at 802, where control circuitry 304 may begin a process for generating for display a plurality of media asset identifiers corresponding to media stored on each user equipment of the plurality of user equipment. Process 800 continues to 804, where control circuitry 304 may query each user equipment of the plurality of user equipment for information pertaining to media assets stored on each respective user equipment. For example, control circuitry 304 may query each user equipment to learn information relating to all movies or programs stored on each user equipment.

Process 800 proceeds to 806, where control circuitry 304 may determine, based on the query, a set of media assets stored on the plurality of user equipment of the group. This set may be a limited set, where, for example, if access controls are implemented such that some media assets are not to be shared, control circuitry 304 excludes those assets from the set.

Process 800 then proceeds to 808, where control circuitry 304 may retrieve (e.g., from media guidance data source 418) display data for each media asset of the set. For example, clip art or thumbnails may be retrieved, such that control circuitry 304 may use these images in generating a media asset identifier. Process 800 concludes at 810, where control circuitry 304 may generate for display the plurality of media asset identifiers based on the display data.

Figure 9:
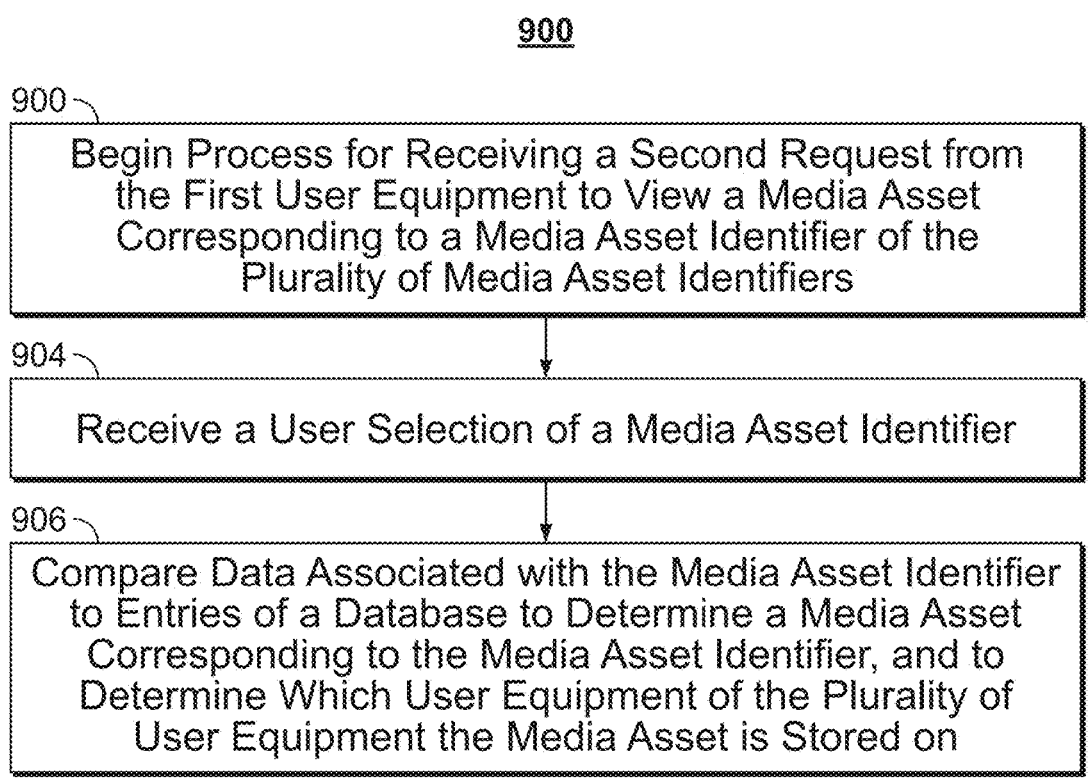
FIG. 9 is a flowchart of illustrative steps involved in receiving a request from a user equipment to view a media asset stored on a different user equipment, in accordance with some embodiments of the disclosure.

FIG. 9 is a flowchart of illustrative steps involved in receiving a request from a user equipment to view a media asset stored on a different user equipment, in accordance with some embodiments of the disclosure. Process 900 of FIG. 9 begins at 902, where control circuitry 304 may begin a process for receiving a second request from the first user equipment to view a media asset corresponding to a media asset identifier of the plurality of media asset identifiers. Process 900 continues to 904, where control circuitry 304 may receive a user selection of a media asset identifier. For example, control circuitry 304 may detect a user selection of an icon corresponding to a movie.

Process 900 continues to 906, where control circuitry 304 may compare data associated with the media asset identifier to entries of a database to determine a media asset corresponding to the media asset identifier, and also to determine which user equipment of the plurality of user equipment the media asset is stored on. For example, control circuitry 304 may compare metadata of the media asset identifier to entries of a database to learn which media asset corresponds to the media asset identifier. Other metadata may be compared against entries of a database to learn which user equipment of the group is storing the media asset.

Figure 10:
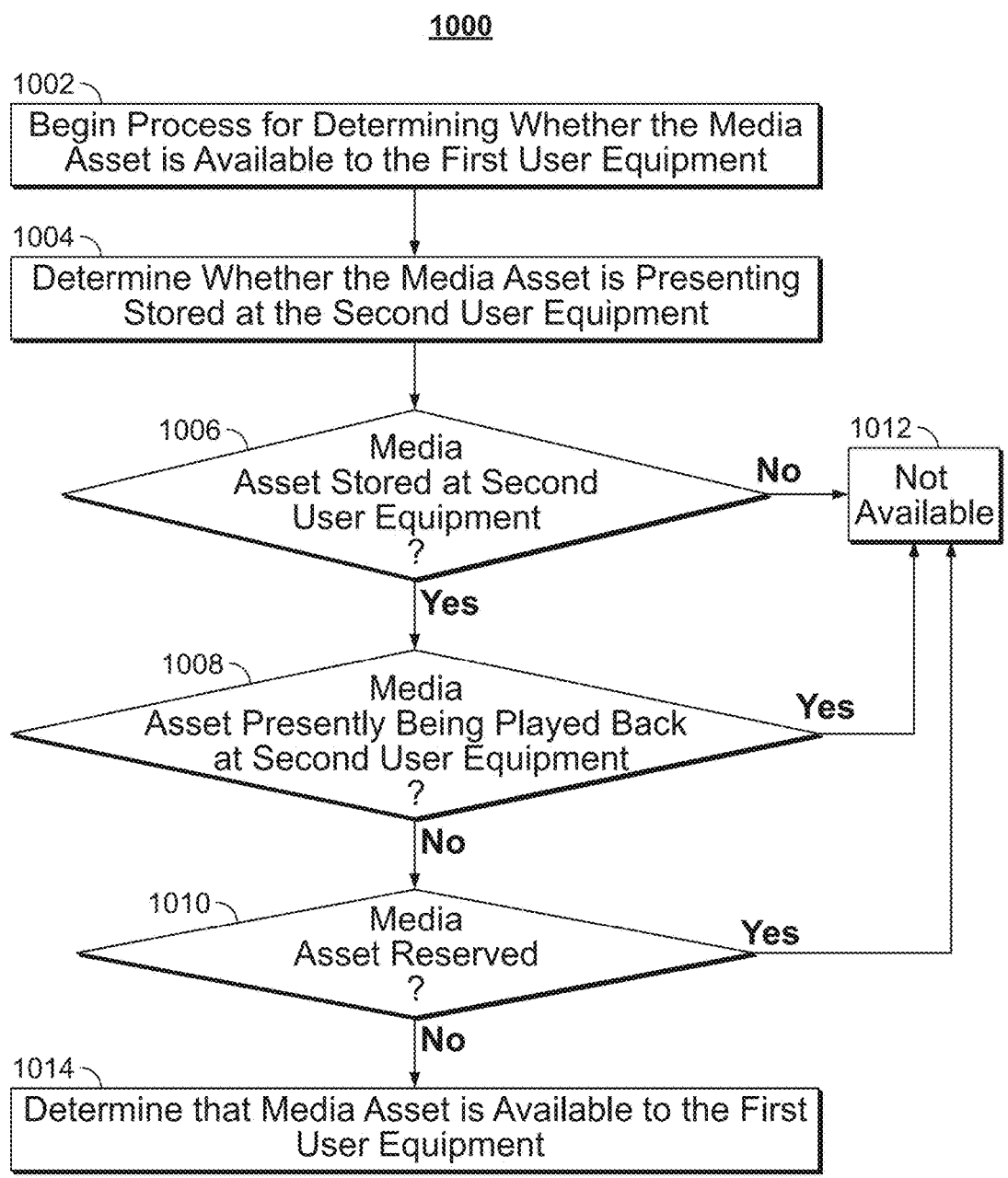
FIG. 10 is a flowchart of illustrative steps involved in determining whether a media asset is available to a user equipment that is requesting access to the media asset, in accordance with some embodiments of the disclosure.

FIG. 10 is a flowchart of illustrative steps involved in determining whether a media asset is available to a user equipment that is requesting access to the media asset, in accordance with some embodiments of the disclosure. Process 1000 of FIG. 10 begins at 1002, where control circuitry 304 may begin a process for determining whether the media asset is available to the first user equipment. Process 1000 continues to 1004, where control circuitry 304 may determine whether the media asset is presently stored at the second user equipment. Control circuitry 304 may perform this determination by transmitting a request to the second user equipment to identify whether its storage 308 contains the media asset.

Process 1000 continues to 1006, where control circuitry 304 determines whether the media asset is stored at the second user equipment (e.g., based on the query). If the media asset is not stored at the second user equipment, process 1000 continues to 1012, where control circuitry 304 determines that the media asset is not available. If control circuitry 304 determines that the media asset is stored at the second user equipment, process 1000 continues to 1008, where control circuitry 304 may determine whether the media asset is presently being played back at the second user equipment. For example, if the media asset is being played back at the second user equipment, transferring the media asset to the first user equipment would be disruptive. Thus, if the media asset is being played back at the second user equipment, the media asset is not available. To this end, if control circuitry 304 determines that the media asset is being played back at the second user equipment, process 1000 continues to 1012, where control circuitry 304 determines that the media asset is not available. If the media asset is not presently being played back at the second user equipment, however, process 1000 continues to 1010.

At 1010, control circuitry 304 may determine whether the media asset is reserved. Description of how control circuitry 304 may determine whether the media asset is reserved is included above and below. If the media asset is reserved, process 1000 may continue to 1012, where control circuitry 304 may determine that the media asset is not available (because it is reserved to be played back by someone else at a conflicting time). If however, control circuitry 304 determines that the media asset is not reserved, process 1000 may continue to 1014, where control circuitry 304 may determine that the media asset is in fact available to the first user equipment.

Figure 11:
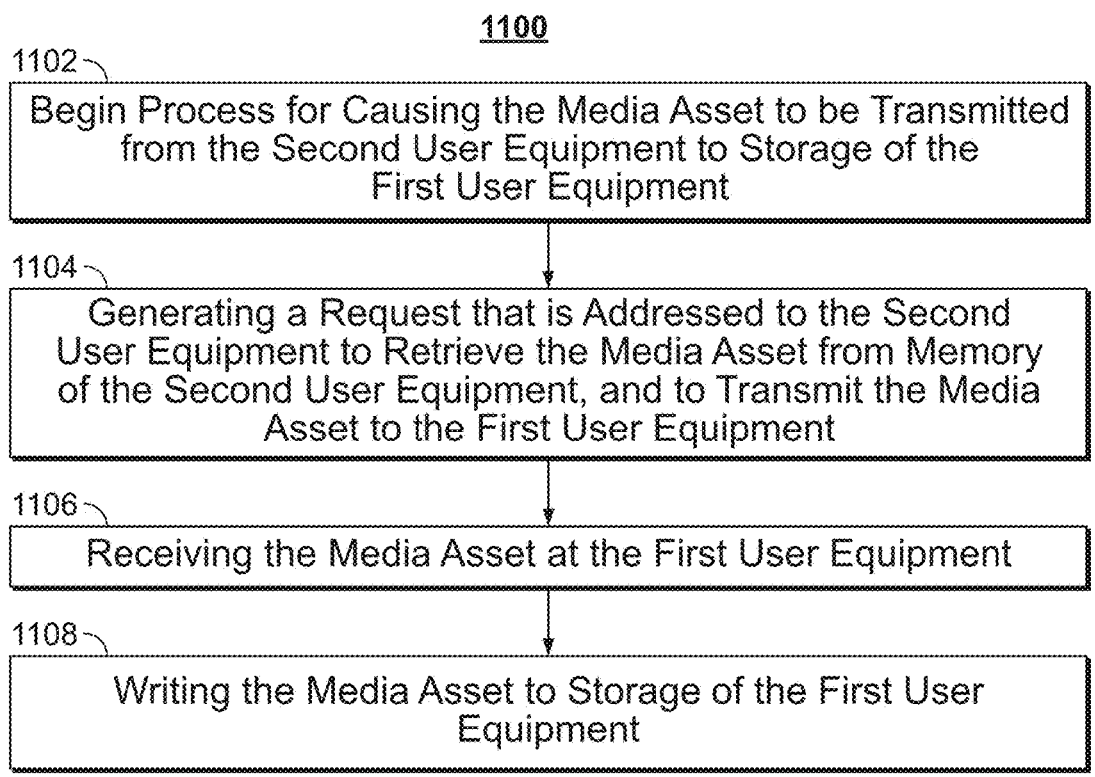
FIG. 11 is a flowchart of illustrative steps involved in causing a media asset to be transferred from user equipment of an owner to a borrowing party, in accordance with some embodiments of the disclosure.

FIG. 11 is a flowchart of illustrative steps involved in causing a media asset to be transferred from user equipment of an owner to a borrowing party, in accordance with some embodiments of the disclosure. Process 1100 of FIG. 11 begins at 1102, where control circuitry 304 may begin a process for causing the media asset to be transmitted from the second user equipment to storage of the first user equipment. Process 1000 continues to 1104, where control circuitry 304 may generate a request that is addressed to the second user equipment to retrieve the media asset from memory of the second user equipment, and to transmit the media asset to the first user equipment. For example, control circuitry 304 may generate a packet header that indicates the second user equipment's device address, and where the payload of the packet instructs the second user equipment to retrieve the media asset from the second user equipment's memory and to transmit the media asset to the first user equipment.

Process 1100 continues to 1106, where control circuitry 304 may detect that the media asset is received at the first user equipment. Process 1100 may then continue to 1108, where control circuitry 304 may write the media asset to storage of the first user equipment.

Figure 12:
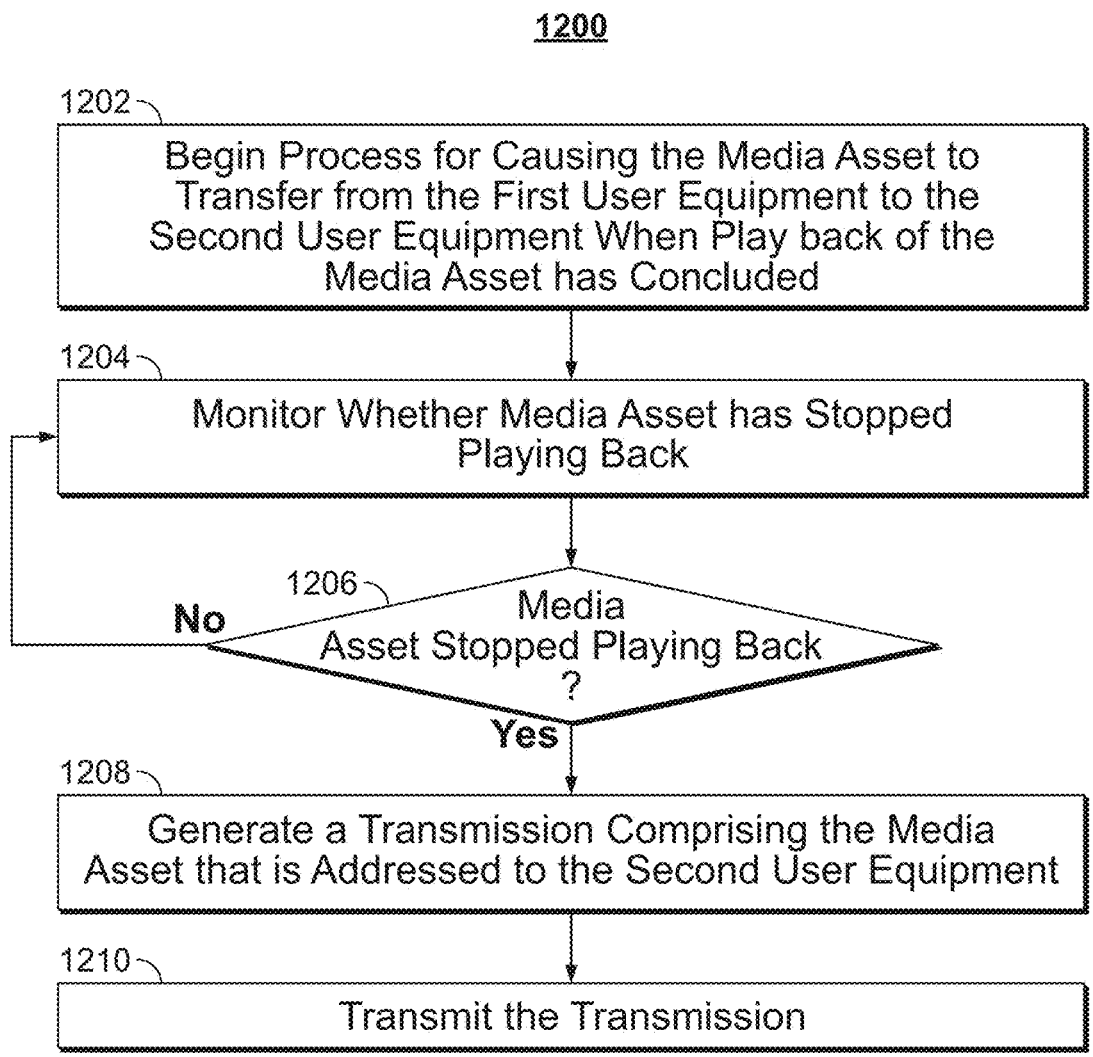
FIG. 12 is a flowchart of illustrative steps involved in causing a media asset to transfer from a borrowing device to an owner's device when playback of the media asset has concluded, in accordance with some embodiments of the disclosure.

FIG. 12 is a flowchart of illustrative steps involved in causing a media asset to transfer from a borrowing device to an owner's device when playback of the media asset has concluded, in accordance with some embodiments of the disclosure. Process 1200 of FIG. 12 begins at 1202, where control circuitry 304 may begin a process for causing the media asset to transfer from the first user equipment to the second user equipment when playback of the media asset has concluded. Process 1200 continues to 1204, where control circuitry 304 may monitor whether the media asset has stopped playing back. For example, control circuitry 304 may determine whether the media asset has been fully played back, or substantially fully played back (e.g., reached a credits reel). Process 1200 then continues to 1206, where control circuitry 304 may determine whether the media asset has stopped playing back.

If control circuitry 304 determines that the media asset has not stopped playing back, process 1200 reverts back to 1204, where control circuitry 304 continues to monitor whether the media asset has stopped playing back. If, however, control circuitry 304 determines that the media asset has stopped playing back, process 1200 continues to 1208, where control circuitry 304 may generate a transmission comprising the media asset that is addressed to the second user equipment. Process 1200 may continue to 1210, where control circuitry 304 may transmit the transmission including the media asset to the second media asset.

Figure 13:
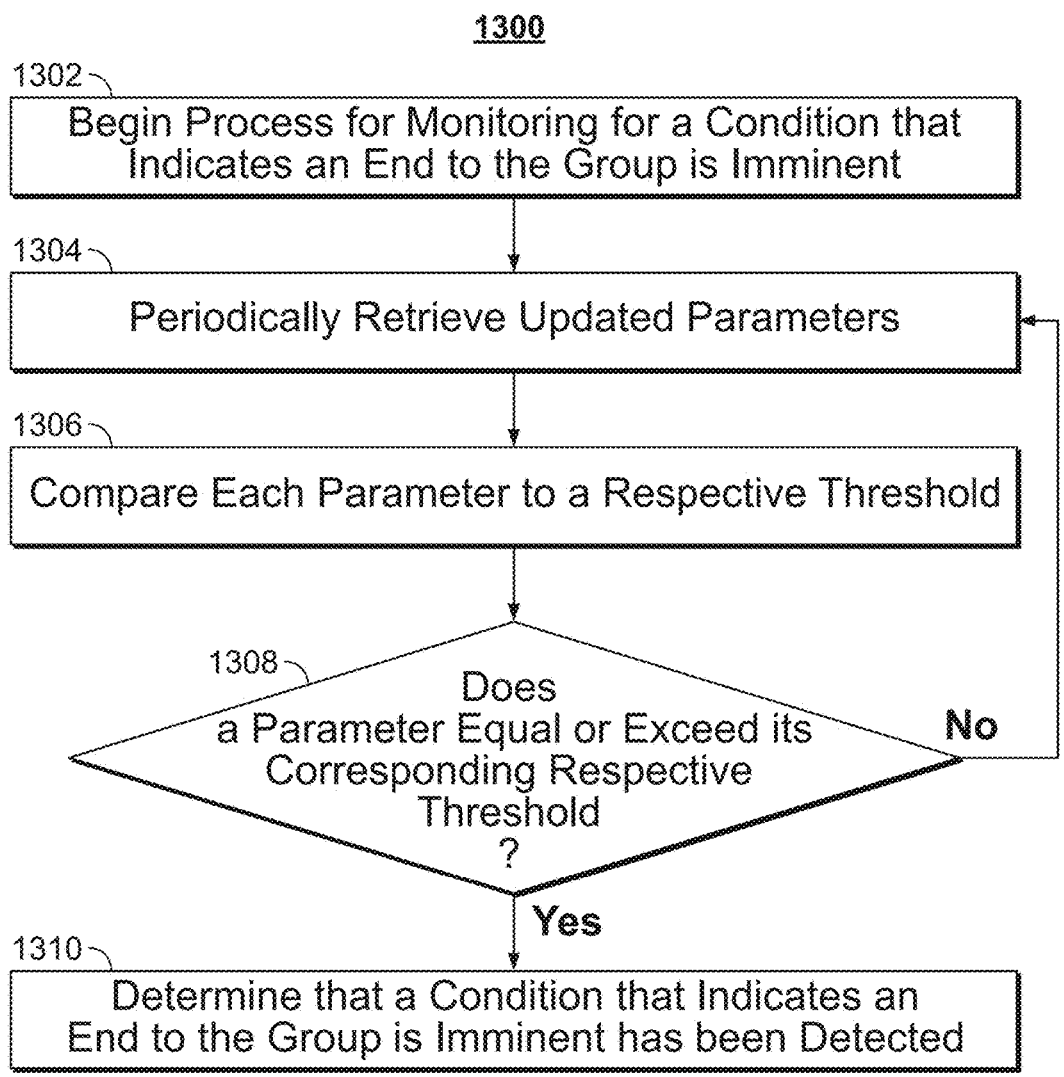
FIG. 13 is a flowchart of illustrative steps involved in monitoring for a condition that indicates an end to a group on a network of a closed environment is imminent, in accordance with some embodiments of the disclosure.

FIG. 13 is a flowchart of illustrative steps involved in monitoring for a condition that indicates an end to a group on a network of a closed environment is imminent, in accordance with some embodiments of the disclosure. Process 1300 of FIG. 13 begins at 1302, where control circuitry 304 may begin a process for monitoring for a condition that indicates an end to the group is imminent. Process 1300 may continue to 1304, where control circuitry 304 may periodically retrieve updated parameters. As an example, control circuitry 304 periodically retrieve data relating to how much flight time is expected, or to what an airplane's altitude is.

Process 1300 may continue to 1306, where each parameter is compared to a respective threshold. For example, an expected remaining flight time of 10 minutes or less may indicate that an end to a group is imminent. Similarly, an altitude of 10,000 feet or less may indicate that a plane is about to land.

Process 1300 may continue to 1308, where control circuitry 304 may determine whether a parameter equals or exceeds its corresponding respective threshold. If control circuitry 304 determines that no parameter equals or exceeds its corresponding respective threshold, process 1300 may revert to 1304, where control circuitry 304 continues to periodically retrieve updated parameters. If, however, control circuitry 304 determines that a parameter does in fact equal or exceed its corresponding respective threshold, process 1300 may continue to 1310, where control circuitry 304 may determine that a condition that indicates an end to the group is imminent has been detected. Control circuitry 304 may, e.g., cause a media asset to be returned to its rightful owner in this instance.

It should be noted that processes 600-1300 or any step thereof could be performed on, or provided by, any of the devices shown in FIGS. 3-5. For example, any of processes 600-1300 may be executed by control circuitry 304 (FIG. 3) as instructed by control circuitry implemented on user equipment 402, 404, and/or 406 (FIG. 4) in order to ensure media borrowed by a user is returned to its rightful owner. In addition, one or more steps of processes 600-1300 may be incorporated into or combined with one or more steps of any other process or embodiment.

It is contemplated that the steps or descriptions of each of FIGS. 6-13 may be used with any other embodiment of this disclosure. In addition, the steps and descriptions described in relation to FIGS. 6-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIGS. 6-13.

Figure 14:
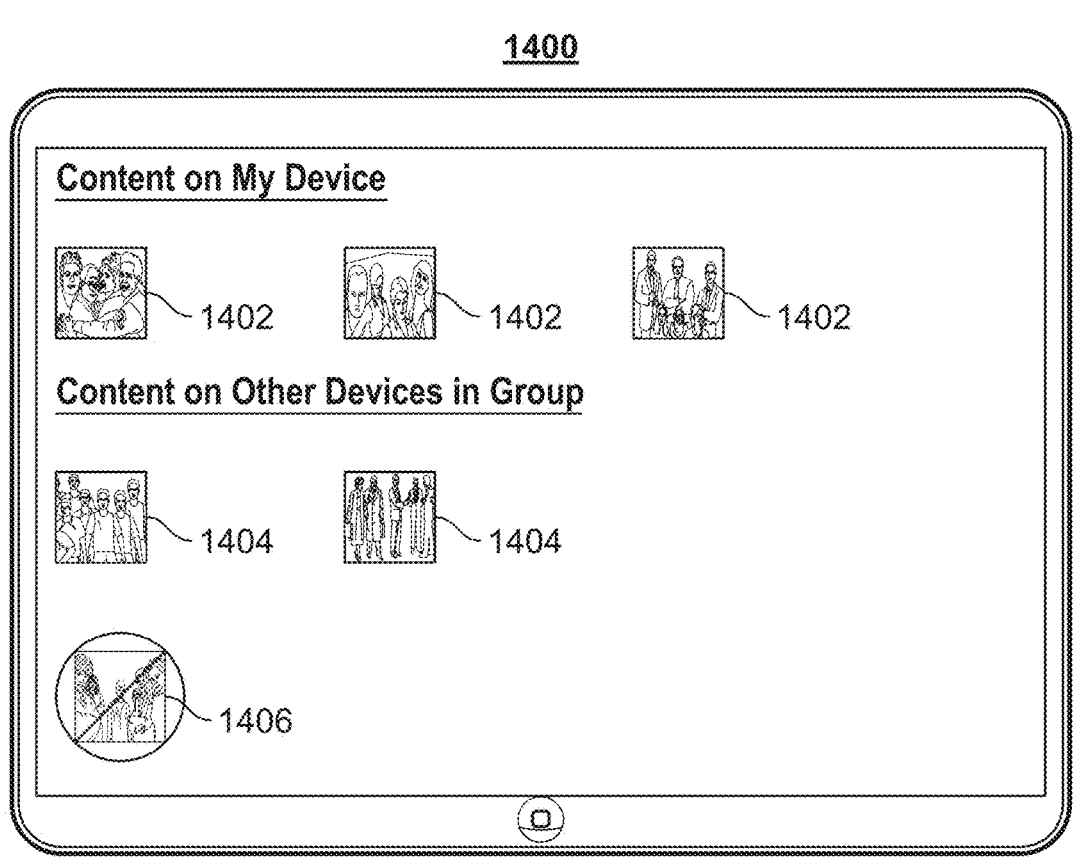
FIG. 14 depicts a user equipment that is displaying a graphical user interface for a media consumption application, in accordance with some embodiments of the disclosure.

FIG. 14 depicts a user equipment that is displaying a graphical user interface for a media consumption application, in accordance with some embodiments of the disclosure. User equipment 1400 may have the same capabilities as user equipment 402, 404, 406, and/or 500. The interface depicted in FIG. 14 may be displayed through display 312. Selectable options 1402 may correspond to content available on a user's own device. Selectable options 1404 may correspond to content available on other users' devices. Selectable option 1406 may correspond to content that is not available for consumption. Any of selectable options 1402,

1404, and 1406 may similarly have an indication of unavailability of their corresponding content.

According to one aspect of the disclosure, the user's own device (e.g., user equipment 1400) may be connected to one or more other devices (e.g., in a group that user equipment 1400 is connected to). Thereby, according to the disclosure, the user has access to content (e.g., content corresponding to selectable options 1404) that is available for viewing on the user's device that is from other users. Various restriction and access controls, as described above and below, are provided herein. According to one aspect, the user is provided access to content associated with selectable options 1404. Preferably, the access is provided by transferring the content to the user's own device (e.g., by way of communications network 1404) from the other users' devices. Alternatively, content may remain on the devices of the other users, but may be streamed to the user's device through an established connection (e.g., Bluetooth, or other communications means described in connection with 414).

In some embodiments, when the user (or any user of a group) is provided access to any content associated with 1402, 1404, or 1406, control circuitry 304 or the media guidance application may ensure that no other devices have access to that same content, including the device where the content is stored. This may be done, for example, by control circuitry 304 generating for display an indication, such as that depicted in 1406, that the content is not available. Alternatively, control circuitry 304 may cause selectable options for content that is not available to not be generated for display by the media guidance application. In other aspects, when the content becomes available (e.g., when control circuitry 304 determines that the user is done viewing the content), the content or access may be returned to the device from which the content was originally accessed (e.g., by a command from control circuitry 304). Additionally, if control circuitry 304 detects that the shared network is about to close for any reason (e.g., a plane is about to land, or any other reason described above and below), the content may be responsively transferred back to its original device (e.g., by a command from control circuitry 304).

In some embodiments, control circuitry 304 may generate for display, on user equipment 1400, (1) one or more first content available for viewing that is stored on the first device (by way of selectable options 1402, and (2) one or more second content available for viewing that is stored on one or more other devices which are connected to the first device (by way of selectable options 1404 or 1406).

In some embodiments, control circuitry 304 of user equipment 1400 may request access to the one or more second content. For example, a user of user equipment 1400 may select selectable option 1404, which may trigger control circuitry 304 to request access to the second content. Control circuitry 304 of user equipment 1400 may then receive access to the requested one or more second content.

In some embodiments, in response to receiving the access to the requested one or more second content, control circuitry 304 may tag the one or more second content as being unavailable to the one or more other devices. For example, an entry in a database (such as media guidance data source 418) may be updated, or a bit flag associated with the entry may be updated, to indicate that the content is unavailable to other devices.

In some embodiments, control circuitry 304 may determine that the one or more second content has been viewed at the first device. For example, control circuitry 304 may determine that the entirety of a video corresponding to 1404 has been viewed at user equipment 1400. In response to determining that the one or more second content has been viewed at the first device, control circuitry 304 may eliminate the access to the one or more second content at the first device (e.g., by transferring the second content back to its original device), and tagging the one or more second content as being available to the one or more other devices (e.g., by causing the database entry to be updated accordingly). Eliminating access, and tagging items as available, may also be done in response to determining that an end of a connection between the devices is imminent, as is described above and below.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, monitoring for a condition indicating that an end to the group is imminent may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, an entry corresponding to a user profile, as described herein, may be stored in, and retrieved from, storage 308 of FIG. 3, or media guidance data source 418 of FIG. 4. Furthermore, processing circuitry, or a computer program, may update settings associated with a user, such as a register of media assets stored on a user's user equipment, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for enabling a plurality of users in a closed environment to share media, the method comprising:
   detecting, at first user equipment, that the Internet is not accessible;
   establishing a network hotspot at the first user equipment;
   broadcasting availability of the network hotspot to devices within broadcast range of the first user equipment;
   receiving a first request from a second user equipment to access the network hotspot and share media assets stored on the second user equipment with a plurality of user equipment that access the network hotspot;

in response to receiving the first request, granting access to the network hotspot to the second user equipment;

generating for display a plurality of media asset identifiers corresponding to media stored on each user equipment of the plurality of user equipment;

receiving a second request from the first user equipment to view a media asset corresponding to a media asset identifier of the plurality of media asset identifiers, wherein the media asset is stored at the second user equipment;

determining whether the media asset is available to the first user equipment; and in response to determining that the media asset is available to the first user equipment, causing the media asset to be transferred from the second user equipment to storage of the first user equipment, wherein the media asset is played back at the first user equipment subsequent to the transferring;

determining that the media asset has concluded playback at the first user equipment; and in response to determining that the media asset has concluded playback at the first user equipment, causing the media asset to transfer from the first user equipment to the second user equipment.

2. The method of claim 1, further comprising:
accessing a user profile of a user of the first user equipment;
determining a preference of the user based on data of the user profile;
comparing metadata associated with each media asset that corresponds to each media asset identifier of the plurality of media asset identifiers to the preference;
ranking the plurality of media asset identifiers based on the comparing; and
generating for display the plurality of media asset identifiers based on the ranking.

3. The method of claim 1, wherein determining whether the media asset is available to the first user equipment comprises:
determining whether the media asset is presently stored at the second user equipment;
in response to determining that the media asset is presently stored at the second user equipment, determining whether the media asset is presently being played back at the second user equipment; and
in response to determining that the media asset is not presently being played back at the second user equipment, determining that the media asset is available to the first user equipment.

4. The method of claim 3, further comprising:
determining whether a user of the second user equipment or a user of a third user equipment has reserved the media asset for playback at a time that is too soon to allow a user of the first user equipment to fully play back the media asset; and
in response to determining that neither the user of the second equipment nor the user of the third user equipment has reserved the media asset for playback at the time that is too soon to allow the user of the first user equipment to fully play back the media asset, determining that the media asset is available to the first user equipment.

5. The method of claim 1, further comprising:
determining that the storage of the first user equipment does not have sufficient capacity to store the media asset;
determining whether the second user equipment has capacity to store a different media asset that is stored in the storage of the first user equipment;
in response to determining that the second user equipment has capacity to store the different media asset, causing the different media asset to be transferred to the second user equipment from the first user equipment prior to causing the media asset to be transferred from the second user equipment to the storage of the first user equipment.

6. The method of claim 1, wherein causing the media asset to transfer from the first user equipment to the second user equipment comprises:
determining that a connection between the first user equipment and the second user equipment has been torn down;
monitoring for an ability to access the Internet;
in response to detecting the ability to access the Internet, accessing the Internet, and transmitting the media asset from the first user equipment to the second user equipment over the Internet.

7. The method of claim 1, further comprising:
determining that the media asset is not available to the first user equipment;
in response to determining that the media asset is not available to the first user equipment, determining a time at which the media asset will be available to the first user equipment; and
generating for display an option to reserve access to the media asset for the first user equipment at the time.

8. The method of claim 7, wherein determining the time at which the media asset will be available to the first user equipment comprises:
determining that the media asset is being played back by the second user equipment;
determining an amount of time that remains until playback by the second user equipment will be complete;
adding the amount of time to the present time to calculate a resultant time; and
determining the time to be the resultant time.

9. The method of claim 1, further comprising:
in response to receiving the second request, determining whether a user of the second user equipment has granted access rights to a user of the first user equipment to access the media asset; and
in response to determining that the user of the second user equipment has granted access rights to the user of the first user equipment, granting access to the first user equipment to access the media asset.

10. A system for enabling a plurality of users in a closed environment to share media, the system comprising:
communications circuitry; and
control circuitry configured to:
detect, at first user equipment, that the Internet is not accessible;
establish a network hotspot at the first user equipment;
broadcast availability of the network hotspot to devices within broadcast range of the first user equipment;
receive, using the communications circuitry, a first request from a second user equipment to access the network hotspot and share media assets stored on the second user equipment with a plurality of user equipment that access the network hotspot;

in response to receiving the first request, granting access to the network hotspot to the second user equipment;
generate for display a plurality of media asset identifiers corresponding to media stored on each user equipment of the plurality of user equipment;
receive, using the communications circuitry, a second request from the first user equipment to view a media asset corresponding to a media asset identifier of the plurality of media asset identifiers, wherein the media asset is stored at the second user equipment;
determine whether the media asset is available to the first user equipment; and
in response to determining that the media asset is available to the first user equipment, cause the media asset to be transferred from the second user equipment to storage of the first user equipment, wherein the media asset is played back at the first user equipment subsequent to the transferring;
determine that the media asset has concluded playback at the first user equipment; and
in response to determining that the media asset has concluded playback at the first user equipment, cause the media asset to transfer from the first user equipment to the second user equipment.

11. The system of claim 10, wherein the control circuitry is further configured to:
access a user profile of a user of the first user equipment;
determine a preference of the user based on data of the user profile;
compare metadata associated with each media asset that corresponds to each media asset identifier of the plurality of media asset identifiers to the preference;
rank the plurality of media asset identifiers based on the comparing; and
generate for display the plurality of media asset identifiers based on the ranking.

12. The system of claim 10, wherein the control circuitry is further configured, when determining whether the media asset is available to the first user equipment, to:
determine whether the media asset is presently stored at the second user equipment;
in response to determining that the media asset is presently stored at the second user equipment, determine whether the media asset is presently being played back at the second user equipment; and
in response to determining that the media asset is not presently being played back at the second user equipment, determine that the media asset is available to the first user equipment.

13. The system of claim 12, wherein the control circuitry is further configured to:
determine whether a user of the second user equipment or a user of a third user equipment has reserved the media asset for playback at a time that is too soon to allow a user of the first user equipment to fully play back the media asset; and
in response to determining that neither the user of the second equipment nor the user of the third user equipment has reserved the media asset for playback at the time that is too soon to allow the user of the first user equipment to fully play back the media asset, determine that the media asset is available to the first user equipment.

14. The system of claim 10, wherein the control circuitry is further configured to:
determine that the storage of the first user equipment does not have sufficient capacity to store the media asset;
determine whether the second user equipment has capacity to store a different media asset that is stored in the storage of the first user equipment;
in response to determining that the second user equipment has capacity to store the different media asset, cause the different media asset to be transferred to the second user equipment from the first user equipment prior to causing the media asset to be transferred from the second user equipment to the storage of the first user equipment.

15. The system of claim 10, wherein the control circuitry is further configured, when causing the media asset to transfer from the first user equipment to the second user equipment, to:
determine that a connection between the first user equipment and the second user equipment has been torn down;
monitor for an ability to access the Internet;
in response to detecting the ability to access the Internet, access the Internet, and transmit the media asset from the first user equipment to the second user equipment over the Internet.

16. The system of claim 10, wherein the control circuitry is further configured to:
determine that the media asset is not available to the first user equipment;
in response to determining that the media asset is not available to the first user equipment, determine a time at which the media asset will be available to the first user equipment; and
generate for display an option to reserve access to the media asset for the first user equipment at the time.

17. The system of claim 16, wherein the control circuitry is further configured, when determining the time at which the media asset will be available to the first user equipment, to:
determine that the media asset is being played back by the second user equipment;
determine an amount of time that remains until playback by the second user equipment will be complete;
add the amount of time to the present time to calculate a resultant time; and
determine the time to be the resultant time.

18. The system of claim 10, wherein the control circuitry is further configured to:
in response to receiving the second request, determine whether a user of the second user equipment has granted access rights to a user of the first user equipment to access the media asset; and
in response to determining that the user of the second user equipment has granted access rights to the user of the first user equipment, grant access to the first user equipment to access the media asset.

* * * * *